(12) United States Patent
Ahn

(10) Patent No.: US 11,875,954 B2
(45) Date of Patent: Jan. 16, 2024

(54) MOTION SENSING DEVICE FOR VACUUM CIRCUIT BREAKER AND VACUUM CIRCUIT BREAKER COMPRISING SAME

(71) Applicant: LS ELECTRIC CO., LTD., Anyang-si (KR)

(72) Inventor: Kwang-Hyeon Ahn, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 185 days.

(21) Appl. No.: 17/431,785

(22) PCT Filed: Sep. 10, 2019

(86) PCT No.: PCT/KR2019/011710
§ 371 (c)(1),
(2) Date: Aug. 18, 2021

(87) PCT Pub. No.: WO2020/171327
PCT Pub. Date: Aug. 27, 2020

(65) Prior Publication Data
US 2022/0139651 A1    May 5, 2022

(30) Foreign Application Priority Data

Feb. 18, 2019  (KR) .................. 10-2019-0018660

(51) Int. Cl.
*H01H 33/666* (2006.01)
*G01D 5/34* (2006.01)

(52) U.S. Cl.
CPC ............. *H01H 33/666* (2013.01); *G01D 5/34* (2013.01)

(58) Field of Classification Search
CPC .......... H01H 33/666; H01H 33/66261; H01H 33/6667; H01H 2033/6667; H01H 1/0015;
(Continued)

(56) References Cited

U.S. PATENT DOCUMENTS 3,925,722 A * 12/1975 Fohrhaltz ............. G01R 27/205
324/415
6,331,687 B1 * 12/2001 Dunk ................. H01H 11/0062
361/45

(Continued)

FOREIGN PATENT DOCUMENTS

| CN | 102683098 A | 9/2012 |
| JP | H04075225 A | 3/1992 |

(Continued)

OTHER PUBLICATIONS

Translation of JP04123734 (Original document published Apr. 23, 1994) (Year: 1992).*

(Continued)

*Primary Examiner* — William A Bolton
(74) *Attorney, Agent, or Firm* — K&L Gates LLP

(57) ABSTRACT

The present disclosure relates to a motion sensing device for a vacuum circuit breaker and a vacuum circuit breaker comprising same. A motion sensing device for a vacuum circuit breaker, according to one embodiment of the present disclosure, comprises: a sensor module, installed adjacent to a main shaft, for sensing an operation state of the main shaft; and a bracket, coupled to the sensor module, for supporting the sensor module.

5 Claims, 8 Drawing Sheets

(58) Field of Classification Search
CPC . H01H 11/0062; H01H 2071/044; G01D 5/34
USPC .......... 218/140; 307/122, 119–121; 324/714; 200/600, 211–212, 61.02, 311, 312, 313
See application file for complete search history.

(56) References Cited

U.S. PATENT DOCUMENTS

| | | | |
|---|---|---|---|
| 7,098,418 | B1 | 8/2006 | Yamada et al. |
| 7,473,863 | B2 * | 1/2009 | Schreiber ............. H01H 33/666 218/138 |
| 8,952,826 | B2 * | 2/2015 | Leccia ............... H01H 33/6662 218/123 |
| 9,218,923 | B2 * | 12/2015 | Johansson ............. H01H 73/12 |
| 9,378,901 | B2 * | 6/2016 | Ashtekar ............. H01H 33/666 |
| 9,633,808 | B2 * | 4/2017 | Ricciuti ............... H01H 1/0015 |
| 10,147,572 | B2 * | 12/2018 | Huo .................... H01H 33/6606 |
| 2006/0181267 | A1 | 8/2006 | Marchand .......... G01R 31/3271 324/750.14 |
| 2017/0047174 | A1 * | 2/2017 | Chen ......................... H01H 3/38 |
| 2017/0194113 | A1 * | 7/2017 | Yang .................. G01R 31/3277 |
| 2018/0254159 | A1 | 9/2018 | Shi et al. |
| 2019/0252135 | A1 | 8/2019 | Roby et al. |

FOREIGN PATENT DOCUMENTS

| | | | | |
|---|---|---|---|---|
| JP | H04123734 | A | 4/1992 | |
| JP | 06215669 | * | 8/1994 | ............. H01H 33/59 |
| JP | 2007149369 | A | 6/2007 | |
| KR | 20100138638 | A | 12/2010 | |
| KR | 101382301 | B1 | 4/2014 | |
| KR | 101448136 | B1 | 10/2014 | |
| KR | 20180127682 | A | 11/2018 | |
| WO | 2004057633 | A1 | 7/2004 | |
| WO | 2018077943 | A1 | 5/2018 | |

OTHER PUBLICATIONS

Translation of JP06215669 (Original document published May 8, 1994) (Year: 1994).*
Japanese Office Action for related Japanese Application No. 2021-547781; action dated Sep. 13, 2022; (3 pages).
International Search Report for related International Application No. PCT/KR2019/011710; dated Aug. 27, 2020; (5 pages).
Written Opinion for related International Application No. PCT/KR2019/011710; dated Aug. 27, 2020; (4 pages).
Extended European Search Report for related European Application No. 19915821.3; dated Apr. 5, 2022; (5 pages).
Japanese Notice of Allowance for related Japanese Application No. 2021-547781; dated Dec. 20, 2022 (3 pages).

* cited by examiner

MOTION SENSING DEVICE FOR VACUUM CIRCUIT BREAKER AND VACUUM CIRCUIT BREAKER COMPRISING SAME

CROSS-REFERENCE TO RELATED APPLICATIONS

This application is the National Stage filing under 35 U.S.C. 371 of International Application No. PCT/KR2019/011710, filed on Sep. 10, 2019, which claims the benefit of earlier filing date and right of priority to Korea utility model Application No. 10-2019-0018660 filed on Feb. 18, 2019, the contents of which are all hereby incorporated by reference herein in their entirety.

FIELD

The present disclosure relates to a motion sensing device for a vacuum circuit breaker capable of detecting operation normality or abnormality of the vacuum circuit breaker, and performance deterioration thereof, and to a vacuum circuit breaker including the same.

BACKGROUND

A vacuum circuit breaker is an electrical protector that uses dielectric strength of vacuum to protect load devices and lines from fault currents in an event of short circuits or ground faults occurring in electrical circuits.

The vacuum circuit breaker performs power transport control and power system protection. The vacuum circuit breaker has a large breaking capacity and high reliability and safety. Since the vacuum circuit breaker may be mounted in a small installation space, the breaker may be easily applied to a voltage range from a medium voltage to high voltage.

Hereinafter, a structure of a general vacuum circuit breaker will be briefly described.

FIG. 1 is a partial cross-sectional view showing a typical vacuum circuit breaker.

As shown in FIG. 1, a general vacuum circuit breaker 1 includes a main circuit 10 including a vacuum interrupter 10a, a push rod assembly 30 and a main shaft 50 for transmitting power to a contact of the vacuum interrupter 10a, and a mechanism assembly 70 that generates a driving force and is connected to the main shaft 50 to transmit the driving force thereto.

The vacuum interrupter 10a includes a fixed electrode 14 fixedly installed inside an insulating container 12, a movable electrode 16 that moves up and down and inside the insulating container 12, a fixed contact 14a disposed at an end of the fixed electrode 14, and a movable contact 16a disposed at an end of the movable electrode 16.

The movable contact 16a of the movable electrode 16 is in contact with the fixed contact 14a in an inserted state. The movable contact 16a of the movable electrode 16 is spaced from the fixed contact 14a in an open state (or "withdrawn state"). The movable electrode 16 ascends or descends via the push rod assembly 30.

The push rod assembly 30 inserts or withdraws the movable electrode 16. When the main shaft 50 transmits the power of the mechanism assembly 70 to the push rod assembly 30, the push rod assembly 30 moves downwardly or upwardly. One end of the main shaft 50 is connected to the mechanism assembly 70, while the other end thereof pivots in one direction or the opposite direction to raise up or lower the push rod assembly 30.

The vacuum circuit breaker 1 having the above structure has a rotary sensor 52 mounted on the main shaft 50 to measure a time duration for which the movable contact 16a is brought into the inserted state or the open state. Reliability of operation characteristics of the vacuum circuit breaker may be determined based on a measuring result from the rotary sensor 52 of whether the movable contact 16a has moved within a predetermined time duration.

However, the rotary sensor has a fixed mechanical lifespan which is generally very shorter, compared to a mechanical lifespan of the vacuum circuit breaker itself. Accordingly, due to the short lifespan of the rotary sensor, the reliability of the operation characteristics of the vacuum circuit breaker may be deteriorated during long-term use thereof.

SUMMARY

A purpose of the present disclosure is to provide a motion sensing device for a vacuum circuit breaker capable of detecting normality or abnormality of the vacuum circuit breaker and performance deterioration thereof, and provide a vacuum circuit breaker including the same.

Purposes of the present disclosure are not limited to the above-mentioned purpose. Other purposes and advantages of the present disclosure that are not mentioned above may be understood based on following descriptions, and will be more clearly understood with reference to embodiments of the present disclosure. Further, it will be readily apparent that the purposes and advantages of the present disclosure may be realized using means and combinations thereof indicated in the Claims.

One embodiment of the present disclosure provides a motion sensing device for a vacuum circuit breaker, wherein the breaker includes: a push rod assembly including a push rod movable upwardly or downwardly to insert or withdrawn a vacuum interrupter; and a main shaft having one end pivotably coupled to the mechanism assembly and the other end coupled to an end of the push rod, wherein the main shaft transmits power generated from the mechanism assembly to the push rod, wherein the motion sensing device comprises: a sensor module installed adjacent to the main shaft for sensing a motion state of the main shaft; and a bracket coupled to the sensor module and supporting the sensor module.

Another embodiment of the present disclosure provides a vacuum circuit breaker comprising: a main circuit having a vacuum interrupter, wherein the vacuum interrupter includes: a fixed electrode fixedly received in an insulating container; a fixed contact disposed at one end of the fixed electrode; a movable electrode installed in the insulating container, wherein the movable electrode is movable downwardly or upwardly; and a movable contact disposed at one end of the movable electrode, wherein the movable contact contacts or is spaced from the fixed contact; a push rod assembly having a push rod coupled to the other end of the movable electrode for raising up or lowering the movable electrode; a main shaft having one end coupled to the push rod and the other end pivotably coupled to a mechanism assembly, wherein the main shaft transmits a driving force to the push rod; and a motion sensing device including: a sensor module installed adjacent to the main shaft for sensing a motion state of the main shaft; and a bracket coupled to the sensor module and supporting the sensor module.

The sensor module may include a pair of circuits facing toward each other while the main shaft is interposed therebetween; a light-emitter disposed on one of the pair of circuits and emitting light; and a light-receiver disposed on the other of the pair of circuits, and facing toward the light-emitter, and receiving light emitting from the light-emitter, wherein the bracket may be coupled to the pair of circuits.

Alternatively, the sensor module may include a circuit facing toward the main shaft; and a light-emitter and a light-receiver disposed on the circuit and side by side, wherein the light-emitter and the light-receiver face toward the main shaft, wherein light emitting from the light-emitter is reflected from a plate plane of the main shaft, and the light-receiver receives the reflected light, wherein the bracket may be disposed on one side face of the main shaft.

The motion sensing device may further include a plurality of sensing slits extending through the main shaft, wherein the light emitting from the light-emitter passes through the plurality of sensing slits, wherein the plurality of sensing slits are spaced apart from each other by a predefined spacing.

The motion sensing device may further include a light-blocking portion disposed between adjacent ones of the plurality of sensing slits to block the light emitting from the light-emitter.

The motion sensing device for the vacuum circuit breaker according to the present disclosure and the vacuum circuit breaker including the same detect the motion state of the main shaft. The stroke of the movable contact may be identified based on the motion state of the main shaft. Thus, operation abnormalities or performance deterioration of each of the main shaft and the movable contact may be detected.

The above-described effects, and specific effects of the present disclosure as not mentioned above will be described based on specific details for carrying out the disclosure.

DETAILED DESCRIPTION

Figure 1:
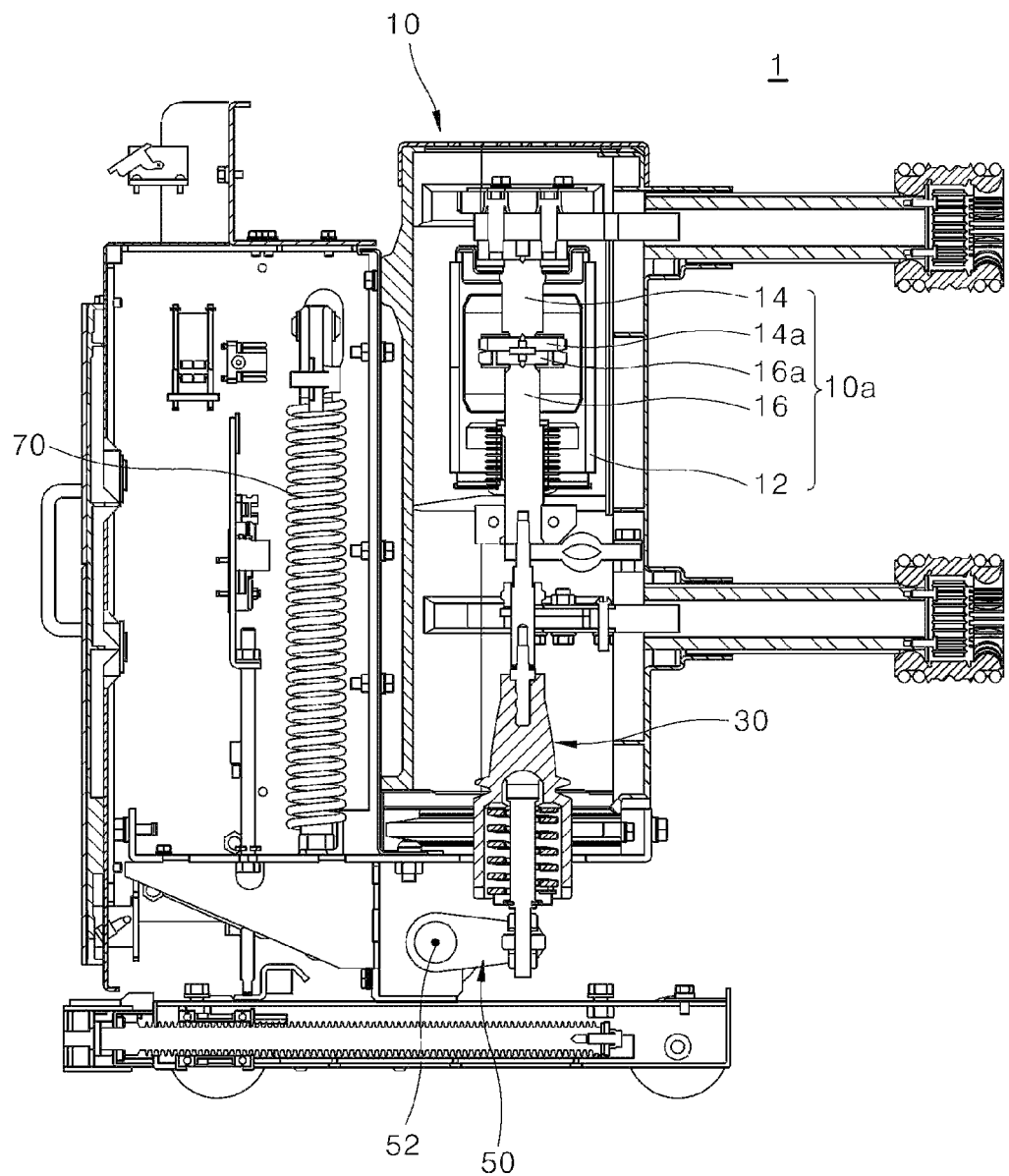
FIG. 1 is a partial cross-sectional view showing a typical vacuum circuit breaker.

The above objects, features and advantages will be described in detail later with reference to the accompanying drawings. Accordingly, a person with ordinary knowledge in the technical field to which the present disclosure belongs will be able to easily implement the technical idea of the present disclosure. In describing the present disclosure, when it is determined that a detailed description of a known component related to the present disclosure may unnecessarily obscure gist the present disclosure, the detailed description is omitted. Hereinafter, a preferred embodiment according to the present disclosure will be described in detail with reference to the accompanying drawings. In the drawings, the same reference numerals are used to indicate the same or similar elements.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Figure 2:
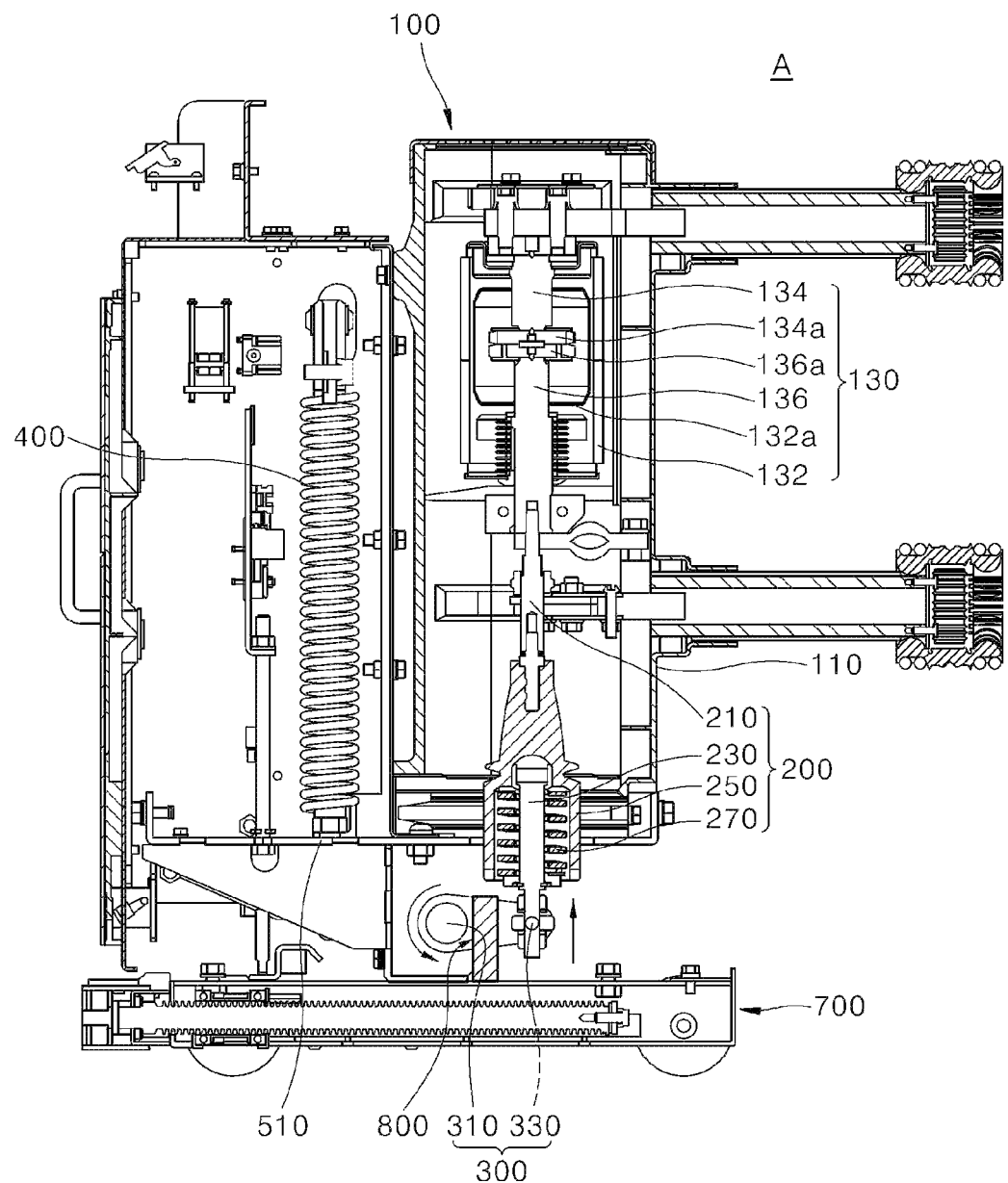
FIG. 2 is a partial cross-sectional view showing a vacuum circuit breaker to which a motion sensing device according to a first embodiment of the present disclosure is applied.
Figure 3:
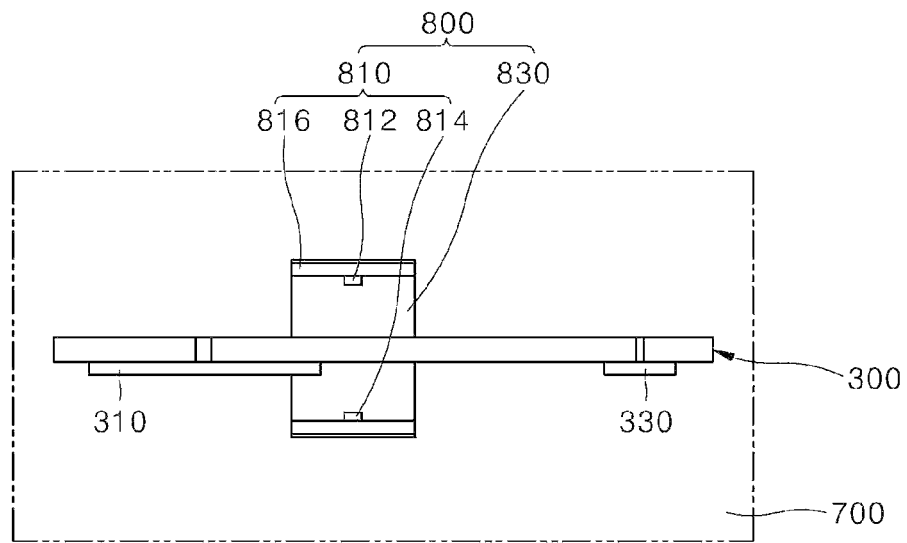
FIG. 3 is a side view showing a mounted state of the motion sensing device according to FIG. 2.
Figure 4:
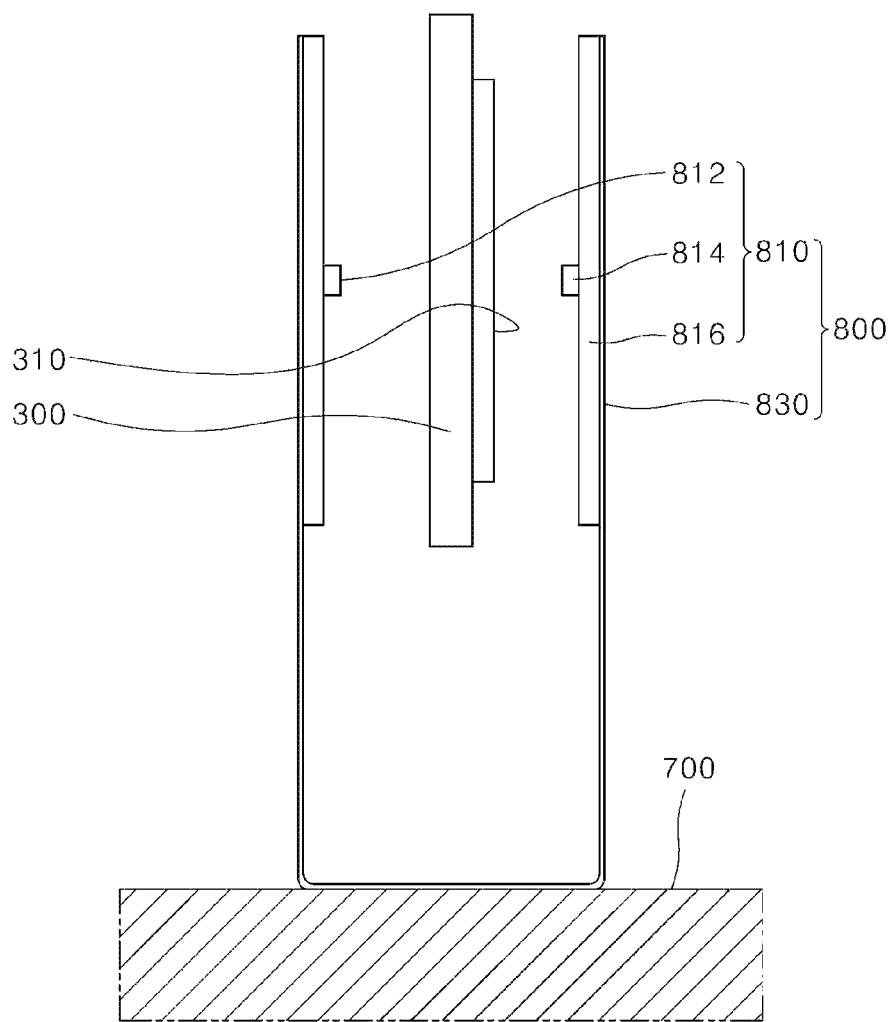
FIG. 4 is a plan view showing the mounted state of the motion sensing device according to FIG. 2.
Figure 5:
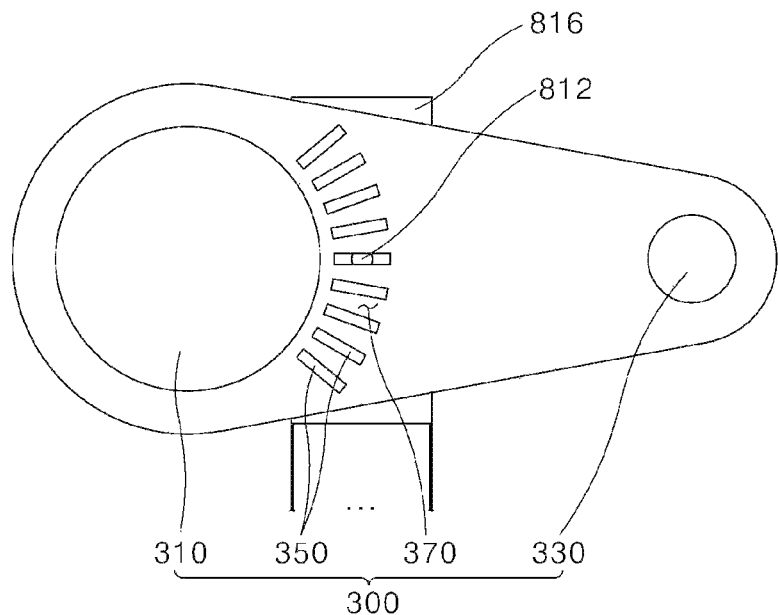
FIG. 5 is a front view showing the mounted state of the motion sensing device according to FIG. 2.
Figure 6:
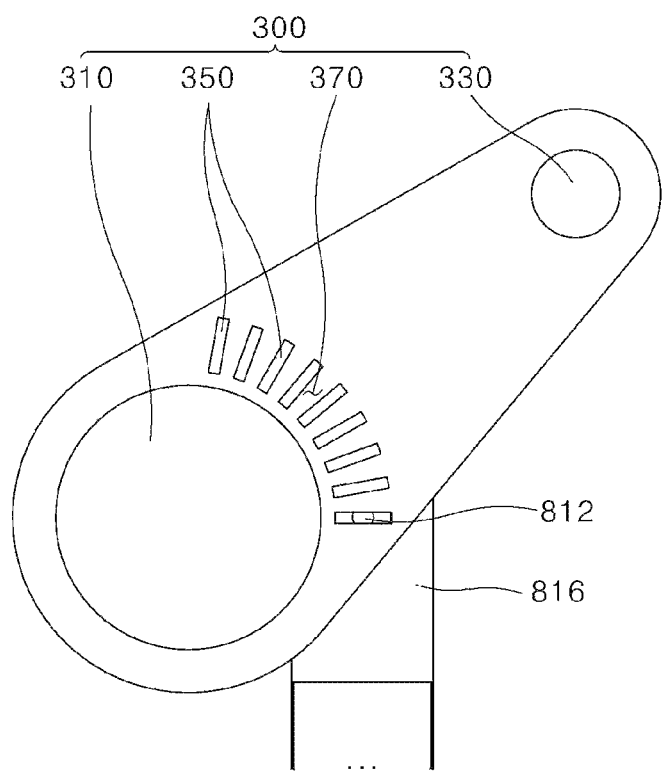
FIG. 6 is a front view showing a motion state of the motion sensing device according to FIG. 2.
Figure 7:
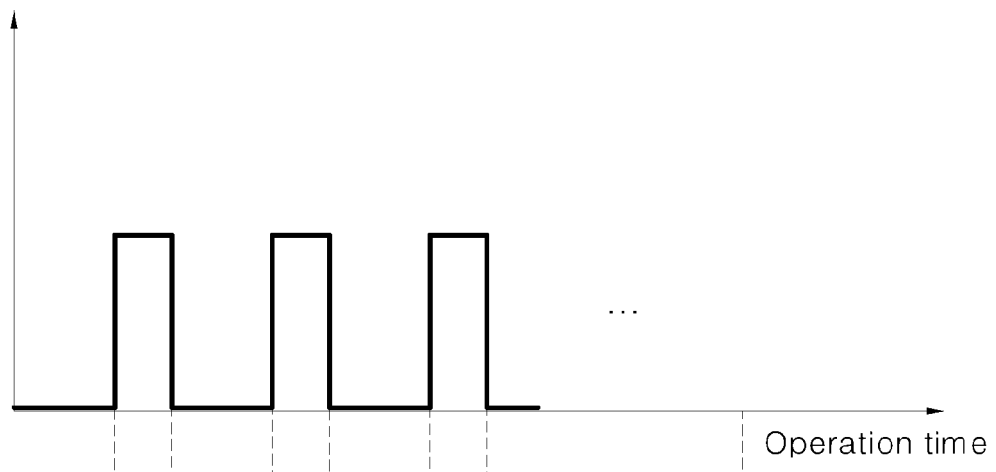
FIG. 7 is a graph showing an output waveform of the motion sensing device and a stroke waveform of the vacuum circuit breaker according to FIG. 2.
Figure 7:
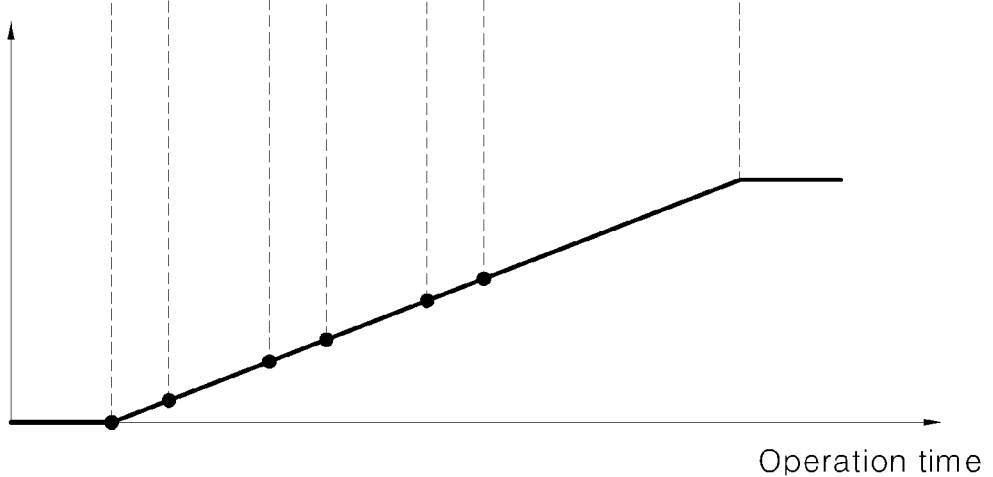

FIG. 1 is a partial cross-sectional view showing a typical vacuum circuit breaker. FIG. 2 is a partial cross-sectional view showing a vacuum circuit breaker to which a motion sensing device according to a first embodiment of the present disclosure is applied. FIG. 3 is a side view showing a mounted state of the motion sensing device according to FIG. 2. FIG. 4 is a plan view showing the mounted state of the motion sensing device according to FIG. 2. FIG. 5 is a front view showing the mounted state of the motion sensing device according to FIG. 2. FIG. 6 is a front view showing a motion state of the motion sensing device according to FIG. 2. FIG. 7 is a graph showing an output waveform of the motion sensing device and a stroke waveform of the vacuum circuit breaker according to FIG. 2.

As shown in FIG. 2, a motion sensing device 800 for a vacuum circuit breaker according to a first embodiment of the present disclosure is installed adjacent to the main shaft 300 of a vacuum circuit breaker A to detect a motion state of the main shaft 300.

A brief description of main components of the vacuum circuit breaker A is as follows (only components necessary for the description of the present disclosure among the components of the vacuum circuit breaker will be briefly described).

The vacuum circuit breaker A includes a main circuit 100 including a vacuum interrupter 130, a push rod assembly 200 and a main shaft 300 for transmitting power to a contact of the vacuum interrupter 130, and a mechanism assembly 400 that generates a driving force and is connected to the main shaft 300 to deliver the driving force thereto. The components of the vacuum circuit breaker A as described above are installed on a track assembly 700.

The main circuit 100 has a housing 110 and the vacuum interrupter 130 installed inside the housing 110. The vacuum interrupter 130 includes an insulating container 132 having a receiving space defined therein, a fixed electrode 134 fixedly received in a upper portion of the insulating container 132, and a fixed contact 134a disposed at an end of the fixed electrode 134, a movable electrode 136 installed in a lower portion of the insulating container 132 to be movable up and down, and a movable contact 136a disposed at an end of the movable electrode 136.

A arc shield 132a that creates vacuum is housed inside the insulating container 132. The arc shield 132a wraps around the fixed electrode 134 and the fixed contact 134a, and the movable electrode 136 and the movable contact 136a. The movable contact 136a may be brought into in an inserted state in which the movable contact 136a comes into contact with the fixed contact 134a under movement of the movable electrode 136 or may be brought into a withdrawn state in which the movable contact 136a is spaced from the fixed contact 134a. The movable electrode 136 ascends or descends under movement of the push rod assembly 200.

The push rod assembly 200 inserts or withdraws the movable electrode 136. The push rod assembly 200 includes a movable rod 210 connected to the movable electrode 136 and a push rod 230 connected to the main shaft 300, and a rod housing 250 having a top coupled to the movable rod 210 and a bottom coupled to the push rod 230, and an inserting spring 270 which is accommodated inside the rod housing 250 and is compressed or restored by the push rod 230. The main shaft 300 is connected to the bottom of the push rod 230.

The main shaft 300 is connected to the mechanism assembly 400 and transmits the power generated from the mechanism assembly 400 to the push rod assembly 200. The main shaft 300 may have a plate shape with a predefined area. One end of the main shaft 300 is pivotably coupled to a lower portion of a power transmission structure of the mechanism assembly 400. The other end of the main shaft 300 is coupled to the push rod 230. The main shaft 300 may have a shape that decreases in size in a direction from one end coupled to the mechanism assembly 400 to the other end coupled to the push rod 230. That is, as shown in FIG. 2, the main shaft 300 may have one end of a shape similar to a shape of a water droplet of a large diameter. Hereinafter, one end of the main shaft 300 coupled to the mechanism assembly 400 is referred to as a first pivotable portion 310, and the other end thereof is referred to as a second pivotable portion 330.

The main shaft 300 may be pivotably coupled to a drive link not shown in the drawing. The main shaft 300 is installed while being exposed out of a lower bracket 510 of the mechanism assembly 400. The first pivotable portion 310 of the main shaft 300 pivots clockwise or counterclockwise as shown in an arrow under the driving force transmitted thereto from the mechanism assembly 400.

When the first pivotable portion 310 pivots counterclockwise, the second pivotable portion 330 ascends as shown by an arrow. When the push rod 230 ascends, the inserting spring 270 is compressed and thus the push rod 230 pushes up the movable rod 210. As the movable rod 210 ascends, the movable contact 136a ascends and is brought into the inserted state in which the movable contact 136a contacts the fixed contact 134a.

Conversely, when the first pivotable portion 310 pivots clockwise, the second pivotable portion 330 descends as shown by an arrow. When the push rod 230 descends, the inserting spring 270 is restored and thus the push rod 230 descends to its original position. As the movable rod 210 descends, the movable contact 136a descends and is brought into the withdrawn (open) state in which the movable contact 136a is spaced from the fixed contact 134a.

Since the main shaft 300 is connected to the push rod assembly 200, the time duration for which the movable contact 136a is brought into an inserted or withdrawn state may be indirectly identified based on the motion state of the main shaft 300 or the push rod assembly 200.

Accordingly, the first embodiment of the present disclosure may provide the motion sensing device 800 which may detect the motion state of the main shaft 300 to detect the time duration for which the movable contact 136a is brought into an inserted or withdrawn state, and determines operation normality or abnormality, performance deterioration or non-deterioration of the breaker A. The motion sensing device 800 is installed adjacent to the main shaft 300.

As shown in FIG. 3 to FIG. 6, the motion sensing device 800 includes a sensor module 810 for sensing a motion of the main shaft 300, and a bracket 830 on which the sensor module 810 is installed. The motion sensing device 800 includes a plurality of sensing slits (350 in FIG. 5) defined in the main shaft 300 so that the sensor module 810 may detect the motion of the main shaft 300.

The sensor module 810 includes a light-emitter 812 that emits light, a light-receiver 814 that receives the light emitting from the light-emitter 812, and each circuit 816 that controls each of the light-emitter 812 and the light-receiver 814 and processes a signal. The light-emitter 812 and the light-receiver 814 are respectively installed on the circuits 816 and face toward each other. That is, the sensor module 810 includes a pair of circuits 816 facing toward each other while the main shaft 300 is interposed therebetween, the light-emitter 812 disposed on one of the pair of circuits 816 to emit light, and the light-receiver 814 that is disposed on the other of the pair of circuits 816 and faces toward the light-emitter 812 and detects the light from the light-emitter 812.

In this sensor module 810, the light emitting from the light-emitter 812 passes through the main shaft 300 and is sensed by the light-receiver 814. Therefore, the light-receiver 814 generates a photocurrent proportional to an intensity of the detected light.

the main shaft 300 is disposed between the light-emitter 812 and the light-receiver 814.

Therefore, when the light from the light-emitter 812 passes through the sensing slit 350, the light from the light-emitter 812 may be detected by the light-receiver 814, and the light-receiver 814 outputs a photocurrent. The sensing slit 350 is defined in the main shaft 300 and will be described in detail below.

To the contrary, when the light from the light-emitter 812 is blocked by the main shaft 300, the light from the light-emitter 812 may not be detected by the light-receiver 814, and thus the light-receiver 814 may not output a photocurrent.

The circuit 816 corresponding to the light-receiver 814 derives a voltage value corresponding to an amount of the photocurrent. In addition, the circuit 816 may transmit the derived voltage value to an external data processing device (not shown) or a separate determination unit (not shown). However, according to a setting or necessity, the circuit 816 may directly use a current value corresponding to the amount of the photocurrent as a determination reference.

The bracket 830 is coupled to the pair of circuits 816 and secures the sensor module 810 onto the track assembly 700. The bracket 830 must support the pair of circuits 816 so that the light-emitter 812 and the light-receiver 814 face toward each other. To this end, the bracket 830 has a "⊏" shape so that the circuits 816 may be respectively coupled to both opposing ends facing toward each other. Alternatively, two straight shaped brackets 830 may respectively be coupled to the two circuits 816 to couple the circuits 816 to the track assembly 700.

The bracket 830 is coupled to the circuits 816 to support the circuits 816. To this end, a length of each of both opposing ends thereof to which the circuits 816 are coupled respectively is larger than a length of each of the circuits 816. Further, a width of each of both opposing ends thereof to which the circuits 816 are coupled respectively is equal to a width of each of the circuits 816.

The main shaft 300 is disposed between the both opposing ends of the bracket 830. Therefore, the light-emitter 812 and the light-receiver 814 respectively mounted on the circuits 816 face toward each other while the main shaft 300 is interposed therebetween. For the sensor module 810 to function properly, the light emitting from the light-emitter 812 must pass through the main shaft 300 and be received by the light-receiver 814. For this purpose, the plurality of sensing slits 350 extend through the main shaft 300.

The sensing slits 350 is adjacent to the first pivotable portion 310 of the main shaft 300, extend through a plate of the main shaft 300, and are spaced apart from each other by a predefined spacing. The plurality of sensing slits 350 may be arranged in a curved manner around the first pivotable portion 310.

In more detail, the first pivotable portion 310 of the main shaft 300 pivots around the second pivotable portion 330. Correspondingly, the sensing slits 350 may be arranged in a curved shape corresponding to a trajectory of the pivoting motion of the main shaft 300.

The plurality of sensing slit 350 are spaced apart from each other by a predefined spacing. Light does not pass through a portion of the main shaft 300 between the sensing slits 350. Thus, hereinafter, the portion is referred to as a light-blocking portion 370.

A width of the sensing slit 350 may be smaller than a width of the light-blocking portion 370. In this way, the light from the light-emitter 812 may be delivered to the light-receiver 814 without affecting motion characteristics and a strength of the main shaft 300.

When the main shaft 300 pivots, the light emitting from the light-emitter 812 passes through the sensing slit 350 and is received by the light-receiver 814. However, as the main shaft 300 pivots such that the light-blocking portion 370 blocks the light-emitter 812, the light is not transmitted to the light-receiver 814. Then, as the pivoting motion of the main shaft 300 moves the sensing slit 350 connected to the light-blocking portion 370 toward the light-emitter 812, the light is transmitted to the light-receiver 814.

As the pass-through and blocking of the light are sequentially repeated when the main shaft 300 pivots, a graph shown in FIG. 7 is derived.

As shown in FIG. 7, when the light emitting from the light-emitter 812 is blocked by the light-blocking portion 370, there is no light detected by the light-receiver 814 of the sensor module 810. Therefore, an output voltage of the sensor module 810 is zero. After the main shaft 300 pivots by an amount equal to one light-blocking portion 370, a position of the sensing slit 350 coincides with a position of the light-emitter 812, and then the light therefrom is received by the light-receiver 814. Therefore, a certain level of an output voltage occurs because the light passes through sensing slit 350. Then, when the light-blocking portion 370 moves and blocks the light-emitter 812, the emitting light is blocked so that the output voltage becomes 0 again.

The push rod 230 moves under the motion of the main shaft 300, and thus the movable electrode 136 is driven by the push rod 230. The movable contact 136a is disposed at the end of the movable electrode 136. The motion of the main shaft 300 triggers the motion of the movable electrode 136. Therefore, a stroke graph of the movable contact 136a may be derived from an output voltage waveform graph of the sensor module 810 based on a spacing between the adjacent sensing slits 350. The stroke of the movable contact 136a means a speed at which the movable contact 136a hits the fixed contact 134a.

When motion abnormality or performance deterioration occurs in at least one of the main shaft 300, the push rod 230 and the movable contact 136a, a spacing in the output voltage waveform of the sensor module 810 or a slope of the movable contact stroke graph of the sensor module 810 changes. Therefore, motion abnormality or performance deterioration of at least one of the main shaft 300, the push rod 230, and the movable contact 136a may be detected.

In the above embodiment, a subject which performs the derivation of the graph of FIG. 7, the determination of the motion abnormality or performance deterioration of the main shaft 300, the push rod 230, or the movable contact 136a, and the user notification may be an external data processing device or a determination unit which is not shown in the drawings. The determination unit may be included in the circuit 516.

In the above-described embodiment, the sensor module 810 in which the light-emitter 812 and the light-receiver 814 face toward each other has been described.

However, according to another embodiment of the present disclosure, a sensor module 810' may include a light-emitter 812' and a light-receiver 814' which are arranged side by side with each other. Hereinafter, a detailed description of the same configuration as that of the above-described embodiment will be omitted.

Figure 8:
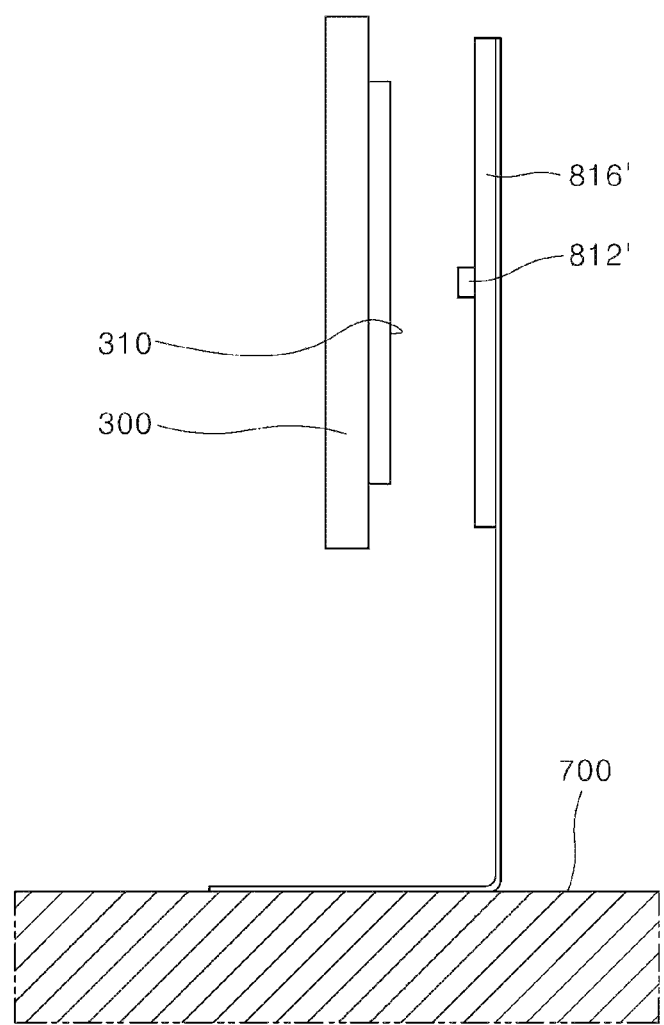
FIG. 8 is a side view showing a mounted state of another motion sensing device according to a second embodiment of the present disclosure.
Figure 9:
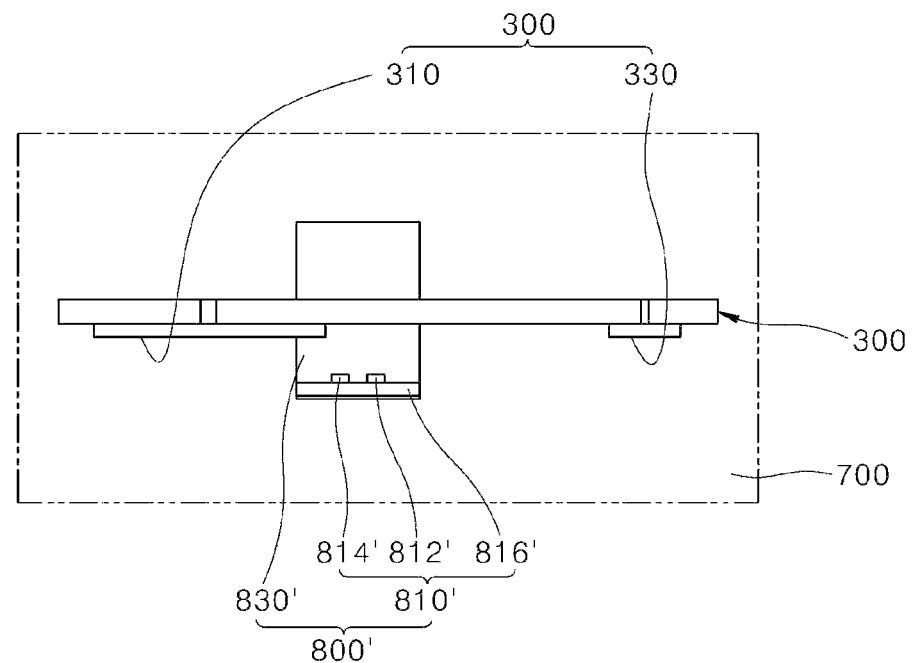
FIG. 9 is a plan view showing the mounted state of the motion sensing device according to FIG. 8.
Figure 10:
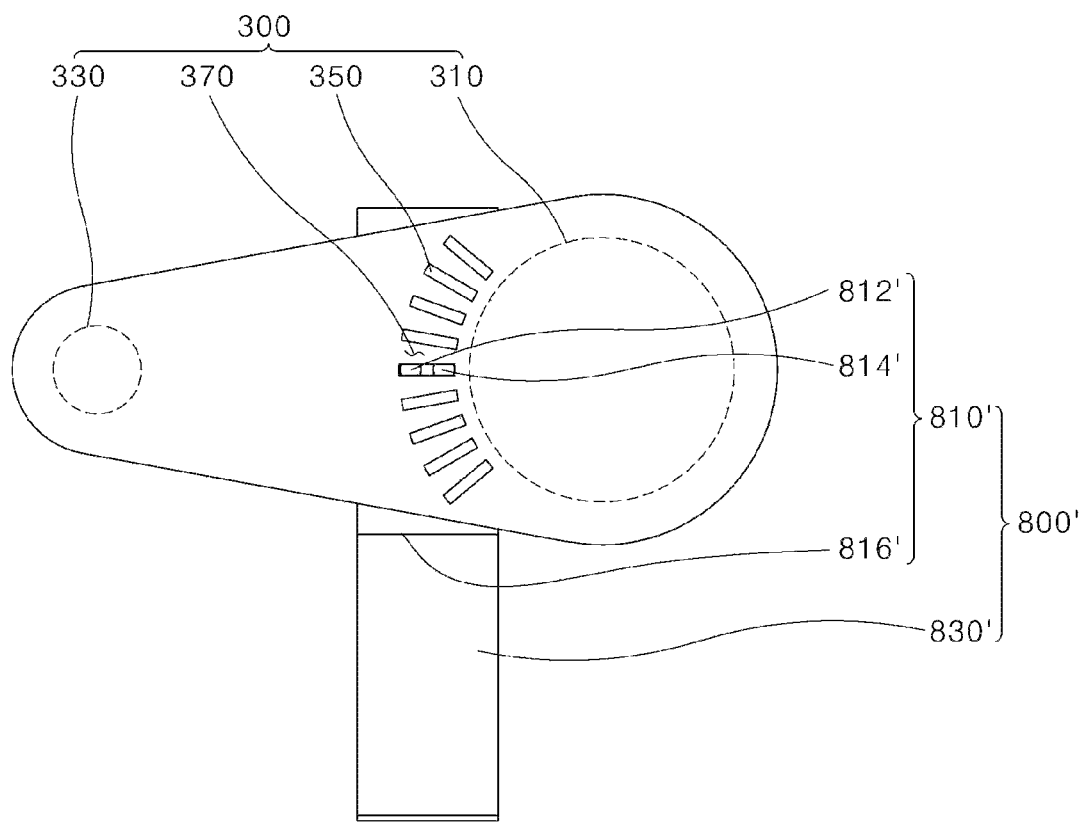
FIG. 10 is a front view showing a motion state of the motion sensing device according to FIG. 8.
Figure 11:
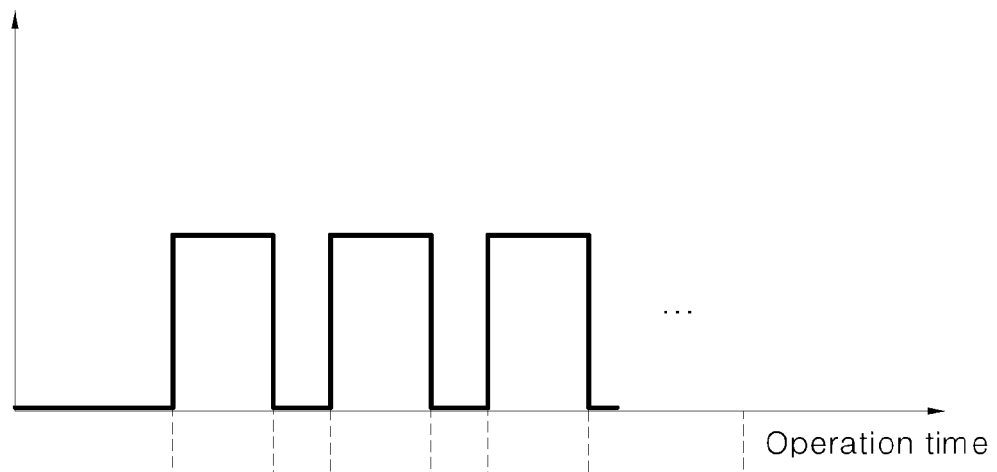
FIG. 11 is a graph showing an output waveform of the motion sensing device and a stroke waveform of a vacuum circuit breaker according to FIG. 8.
Figure 11:
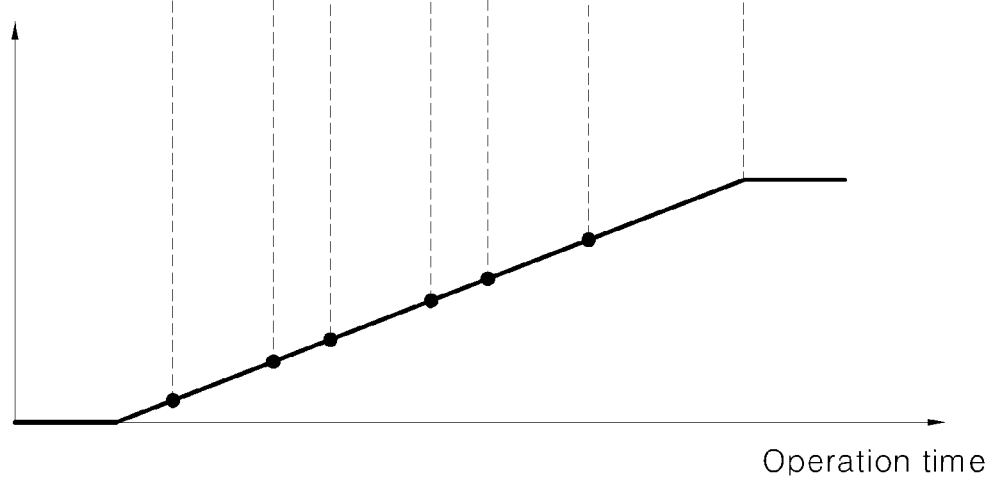

FIG. 8 is a side view showing a mounted state of another motion sensing device in the second embodiment of the present disclosure. FIG. 9 is a plan view showing the mounted state of the motion sensing device according to FIG. 8. FIG. 10 is a front view showing the motion state of the motion sensing device according to FIG. 8. FIG. 11 is a graph showing an output waveform of the motion sensing device and a stroke waveform of the vacuum circuit breaker according to FIG. 8.

As shown in FIG. 8 to FIG. 10, the motion sensing device 800' according to the second embodiment of the present disclosure may include the sensor module 810' and a bracket 830'. The sensor module 810' includes the light-emitter 812' and the light-receiver 814' which are arranged side by side with each other.

That is, the sensor module 810' may include one circuit 816'. Both of the light-emitter 812' and the light-receiver 814' may be installed on the same face of the circuit 816' facing toward the main shaft 300. In this connection, the light emitting from the light-emitter 812' is reflected back from a plate plane of the main shaft 300 and then the light-receiver 814' receives the reflected light.

In other words, the sensor module 810' includes the circuit 816' facing toward one face of the main shaft 300, and the light-emitter 812' and the light-receiver 814' which are disposed on the circuit 816' and are arranged side by side with each other.

As in the first embodiment, the plurality of sensing slit 350 are defined in the main shaft 300.

Further, when the light emitting from the light-emitter 812' passes through the sensing slit 350, the light may not be detected by the light-receiver 814' disposed on the same face on which the light-emitter 812' is disposed. Thus, the light-receiver 814' does not output the photocurrent. On the contrary, when the light emitting from the light-emitter 812' is reflected from the light-blocking portion 370, the light may be detected by the light-receiver 814', so that the light-receiver 814' outputs a photocurrent.

In this connection, a width of the light-blocking portion 370 is larger than a width of the sensing slit 350. Accordingly, a time duration for which the light-receiver 814' receives the light becomes larger than that in the first embodiment. Therefore, as shown in FIG. 11, a period of an output voltage waveform of the sensor module 810' may be larger than that in the first embodiment.

In the first embodiment, the emitting light is detected by the light-receiver 814' only when the light passes through the sensing slit 350. Thus, a waveform graph is derived in which a time duration for which the output voltage of the sensor module 810 is 0 is larger than a time duration for which the output voltage of the sensor module 810 is not 0.

However, in the second embodiment, the emitting light is detected by the light-receiver 814' only when the light is reflected from the light-blocking portion 370. Thus, a waveform graph is derived in which a time duration for which the output voltage of the sensor module 810' is not 0 is larger than a time duration for which the output voltage of the sensor module 810' is 0.

In addition, in the second embodiment, when motion abnormality or performance deterioration occurs in at least one of the main shaft 300, the push rod 230, and the movable contact 136a, a waveform spacing per time of the main shaft 300 or a slope of the stroke graph of the movable contact 136a changes. Therefore, motion abnormality or performance deterioration of at least one of the main shaft 300, the push rod 230, and the movable contact 136a may be detected.

The present disclosure as described above may be subjected to various substitutions, modifications and changes within the scope that does not depart from the technical spirit of the present disclosure by those of ordinary skill in the technical field to which the present disclosure belongs. Thus, the present disclosure is not limited to the above-described embodiments and the attached drawings.

What is claimed is:

1. A motion sensing device for a vacuum circuit breaker, wherein the breaker includes:
   a push rod assembly including a push rod movable upwardly or downwardly to insert or withdrawn a vacuum interrupter; and
   a main shaft having a first end pivotably coupled to a mechanism assembly and a second end coupled to an end of the push rod, wherein the main shaft transmits power generated from the mechanism assembly to the push rod,
   wherein the motion sensing device comprises:
      a sensor module installed adjacent to the main shaft for sensing a motion state of the main shaft; and
      a bracket coupled to the sensor module and supporting the sensor module,
   wherein the sensor module includes:
      a circuit facing toward the main shaft; and
      a light-emitter and a light-receiver disposed on the circuit and side by side,
   wherein the light-emitter and the light-receiver face toward the main shaft,
   wherein a plate plane of the main shaft is configured to reflect light emitting from the light-emitter for the light-receiver to receive as reflected light,
   wherein the bracket is disposed on one side face of the main shaft,
   wherein the motion sensing device further comprising a plurality of sensing slits extending through the main shaft, wherein the plurality of sensing slits is configured to permit the light emitting from the light-emitter to pass through the plurality of sensing slits, wherein the plurality of sensing slits are spaced apart from each other by a predefined spacing.

2. The motion sensing device of claim 1, further comprising a light-blocking portion disposed between adjacent ones of the plurality of sensing slits to block the light emitting from the light-emitter,
   wherein a width of each of the sensing slits is smaller than a width of the light-blocking portion.

3. A vacuum circuit breaker comprising:
   a main circuit having a vacuum interrupter, wherein the vacuum interrupter includes:
      a fixed electrode fixedly received in an insulating container;
      a fixed contact disposed at one end of the fixed electrode;
      a movable electrode installed in the insulating container, wherein the movable electrode is movable downwardly or upwardly; and
      a movable contact disposed at a first end of the movable electrode, wherein the movable contact contacts or is spaced from the fixed contact;
   a push rod assembly having a push rod coupled to a second end of the movable electrode for raising up or lowering the movable electrode;
   a main shaft having a first main shaft end coupled to the push rod and a second main shaft end pivotably coupled to a mechanism assembly, wherein the main shaft transmits a driving force to the push rod; and
   a motion sensing device including:
      a sensor module installed adjacent to the main shaft for sensing a motion state of the main shaft; and
      a bracket coupled to the sensor module and supporting the sensor module,
      wherein the sensor module includes:
         a pair of circuits facing toward each other while the main shaft is interposed therebetween;
         a light-emitter disposed on a first one of the pair of circuits and emitting light; and
         a light-receiver disposed on a second one of the pair of circuits, and facing toward the light-emitter, and receiving light emitting from the light-emitter, wherein the bracket is coupled to the pair of circuits,
      wherein the motion sensing device further includes a plurality of sensing slits extending through the main shaft, wherein the light emitting from the light-emitter passes through the plurality of sensing slits, wherein the plurality of sensing slits are spaced apart from each other by a predefined spacing.

4. A vacuum circuit breaker comprising:
   a main circuit having a vacuum interrupter, wherein the vacuum interrupter includes:
      a fixed electrode fixedly received in an insulating container;
      a fixed contact disposed at one end of the fixed electrode;
      a movable electrode installed in the insulating container, wherein the movable electrode is movable downwardly or upwardly; and a movable contact disposed at a first end of the movable electrode, wherein the movable contact contacts or is spaced from the fixed contact;

a push rod assembly having a push rod coupled to a second end of the movable electrode for raising up or lowering the movable electrode;

a main shaft having a first main shaft end coupled to the push rod and a second main shaft end pivotably coupled to a mechanism assembly, wherein the main shaft transmits a driving force to the push rod; and a motion sensing device including:
- a sensor module installed adjacent to the main shaft for sensing a motion state of the main shaft; and
- a bracket coupled to the sensor module and supporting the sensor module, wherein the sensor module includes:
- a circuit facing toward the main shaft; and
- a light-emitter and a light-receiver disposed on the circuit and side by side, wherein the light-emitter and the light-receiver face toward the main shaft, wherein a plate plane of the main shaft is configured to reflect light emitting from the light-emitter for the light-receiver to receive as reflected light, wherein the bracket is disposed on one side face of the main shaft, wherein the motion sensing device further includes a plurality of sensing slits extending through the main shaft, wherein plurality of sensing slits are configured to permit the light emitting from the light-emitter to pass through the plurality of sensing slits, wherein the plurality of sensing slits are spaced apart from each other by a predefined spacing.

5. The vacuum circuit breaker of claim 4, wherein the motion sensing device further includes a light-blocking portion disposed between adjacent ones of the plurality of sensing slits to block the light emitting from the light-emitter, wherein a width of each of the sensing slits is smaller than a width of the light-blocking portion.

* * * * *